No. 777,419. PATENTED DEC. 13, 1904.
F. M. & G. HOYT.
APPLIANCE FOR FLORAL DECORATIONS.
APPLICATION FILED JAN. 29, 1904.
NO MODEL.
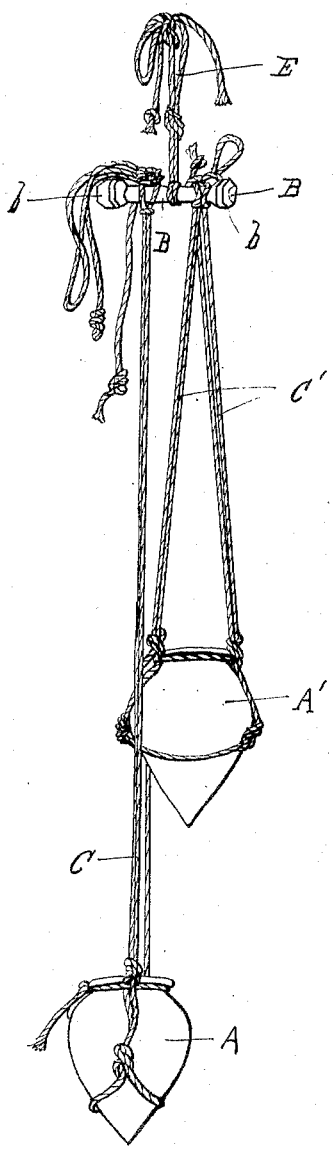
WITNESSES
F. W. Wright.
Walter Abbe
INVENTORS
Frances M. Hoyt
Grace Hoyt
BY
Howson and Howson
ATTORNEYS No. 777,419.   Patented December 13, 1904.

UNITED STATES PATENT OFFICE.

FRANCES M. HOYT AND GRACE HOYT, OF NEW YORK, N. Y.

APPLIANCE FOR FLORAL DECORATIONS.

SPECIFICATION forming part of Letters Patent No. 777,419, dated December 13, 1904.

Application filed January 29, 1904. Serial No. 191,168. (No model.)

*To all whom it may concern:*

Be it known that we, FRANCES M. HOYT and GRACE HOYT, citizens of the United States of America, residing in the borough of Manhattan, in the county and State of New York, have invented an Appliance for Floral Decorations, of which the following is a specification.

Our invention consists of an improved means for suspending vases to contain flowers, particularly for decorative purposes, as at balls, dinners, and other social functions or for use in homes or store-windows or elsewhere.

The figure in the accompanying drawing is a perspective view illustrating a preferred form of our improvement.

A and A' are decorative vases, which may be of glass or any other suitable material and of any suitable shape or size adapted to receive and hold cut or growing flowers. These vases are to be suspended at different heights by means of chains, cords, wire, or raffia of any suitable color. In the drawing we have illustrated cords C C' as tied around the projecting rims of the vases and passing around the bodies thereof and tied in a suitable way to provide two sets of suspending-cords for each vase. The upper ends of these suspending-cords C are connected in any suitable way to a short cross-bar B near its opposite ends, so that one vase is suspended from one end of the cross-bar and the other vase from the other end. By this means the vases are spaced apart sufficiently to prevent the cords of the lower vase from interfering with the proper position of the upper vase, but yet sufficiently close to give a unique decorative effect. The bar is provided with enlarged ends b to prevent the tied ends of the suspending-cords from slipping off. A third cord E is tied to the middle of the bar and is employed to suspend the whole from a chandelier or any other convenient suspension means where the appliance is to be employed.

The bar B may be of metal, wood, or glass and may be of any suitable length from which to suspend two or more vases, and the suspending-cord E will be adjusted to the proper position along the length of the bar accordingly, the points of suspension of the vase-supporting cords being sufficient distances on opposite sides of the cross-bar-supporting cord to maintain the latter in horizontal position and so that the larger cord will not interfere with the upper vase or vases.

In the claim we use the term "cords" in a sufficiently general sense to embrace also cord as such, wire, chains, or raffia, for example, and of any suitable color, length, or size.

We claim as our invention—

The herein-described means for suspending a plurality of flower-vases, consisting of the combination of a plurality of vases with a short cross-bar, a cord for suspending said bar at a point between its ends, and cords of different lengths for suspending the said vases from different parts of the cross-bar and at different distances from the cross-bar, the points of suspension of the vase-supporting cords being a sufficient distance on opposite sides of the suspending-cord of the cross-bar to maintain the latter in horizontal position and so that the longer vase-suspension cord will not interfere with the upper vase, substantially as described.

In testimony whereof we have signed our names to this specification in the presence of two subscribing witnesses.

FRANCES M. HOYT.
GRACE HOYT.

Witnesses:
  GRANT SQUIRES,
  S. E. J. SQUIRES.